United States Patent
Himmer et al.

(10) Patent No.: US 7,494,233 B2
(45) Date of Patent: Feb. 24, 2009

(54) OFF-AXIS VARIABLE FOCUS AND ABERRATION CONTROL MIRRORS AND METHOD

(75) Inventors: Phillip A. Himmer, Bozeman, MT (US); David L. Dickensheets, Bozeman, MT (US)

(73) Assignee: Montana State University, Bozeman, MT (US)

(*) Notice: Subject to any disclaimer, the term of this patent is extended or adjusted under 35 U.S.C. 154(b) by 0 days.

(21) Appl. No.: 10/543,237

(22) PCT Filed: Jan. 26, 2004

(86) PCT No.: PCT/US2004/001896

§ 371 (c)(1),
(2), (4) Date: Feb. 24, 2006

(87) PCT Pub. No.: WO2004/068180

PCT Pub. Date: Aug. 12, 2004

(65) Prior Publication Data

US 2006/0232846 A1    Oct. 19, 2006

Related U.S. Application Data

(60) Provisional application No. 60/442,315, filed on Jan. 24, 2003.

(51) Int. Cl.
*G02B 5/08* (2006.01)
(52) U.S. Cl. ........................ 359/846; 359/849
(58) Field of Classification Search .................. 359/849
See application file for complete search history.

(56) References Cited

U.S. PATENT DOCUMENTS

| | | | |
|---|---|---|---|
| 4,734,557 A * | 3/1988 | Alfille et al. | 219/121.74 |
| 4,915,494 A * | 4/1990 | Shipley et al. | 359/848 |
| 4,993,823 A * | 2/1991 | Schaffer et al. | 359/849 |
| 5,311,360 A | 5/1994 | Bloom | |
| 5,355,181 A | 10/1994 | Ashizaki | |
| 5,467,104 A | 11/1995 | Furness, III | |
| 5,661,592 A | 8/1997 | Bornstein | |
| 5,777,807 A | 7/1998 | Bar | |
| 5,986,795 A | 11/1999 | Chapman | |
| 6,002,661 A | 12/1999 | Abe | |
| 6,108,121 A * | 8/2000 | Mansell et al. | 359/291 |
| 6,181,459 B1 | 1/2001 | La Fiandra | |
| 6,236,490 B1 | 5/2001 | Shen | |
| 6,293,680 B1 | 9/2001 | Bruns | |
| 6,398,372 B1 | 6/2002 | Okada | |
| 6,507,082 B2 | 1/2003 | Thomas | |
| 6,656,768 B2 | 12/2003 | Thomas | |
| 6,661,561 B2 | 12/2003 | Fitzpatrick | |

OTHER PUBLICATIONS

Himmer, Phillip A., et al.; Micromachined silicon nitride deformable mirrors for focus control; *Optics Letters*, Aug. 15, 2001, pp. 1280-1282; vol. 26, No. 16; Optical Society of America.

(Continued)

*Primary Examiner*—Joshua L Pritchett
(74) *Attorney, Agent, or Firm*—Cooley Godward Kronish LLP

(57) ABSTRACT

An optical element with multi-layer composites that deforms to reduce optical aberrations in off-axis optic. Methods are also described in relation to the optical element.

14 Claims, 6 Drawing Sheets

OTHER PUBLICATIONS

Himmer, Phillip et al.; High speed, large deflection deformable mirrors for focus and spherical aberration control; 2002 IEEE/LEOS International Conference on Optical MEMS, Aug. 20-23, 2002; pp. 193-104; IEEE Catalog No.: 02EX610; ISBN 0-7803-7595-5.

Timoshenko and Goodier, Membrane Analogy, *Theory of Elasticity*, pp. 303-307, Engineering Societies Monographs, 3rd ed., McGraw Hill 1970.

Florence, James M. et al.; Coherent optical correlator using a deformable mirror device spatial light modulator in the Fourier plane, *Applied Optics*, pp. 2091-2093, vol. 27, No. 11, Optical Society of America, Jun. 1, 1988.

McQuaide, Sarah C., et al.; 50.4: Three-dimensional Virtual Retinal Display System using a Deformable Membrane Mirror, Society for Information Display, 2002 International Symposium, Digest of Technical Papers, pp. 1324-1327, vol. 33, No. 2, May 22-23, 2002.

Suyama, Shiro et al.; Three-Dimensional Display System with Dual-Frequency Liquid-Crystal Varifocal Lens, *Japanese Journal of Applied Physics*, pp. 480-482, vol. 39, No. 2A, Publication board, Japanese Journal of Applied Physics, Feb. 2000.

Mills, Peter H., et al.; High-speed interaction on a vibrating-mirror 3D display, *Processing and Display of Three-Dimensional Data II*, pp. 93-101, vol. 507, International Society of Optical Engineering, Aug. 23-24, 1984.

\* cited by examiner

OFF-AXIS VARIABLE FOCUS AND ABERRATION CONTROL MIRRORS AND METHOD

CROSS REFERENCE TO RELATED APPLICATION

This application is a U.S. national phase application under 35 U.S.C. § 371(c) of PCT Application No. PCT/US2004/001896, filed Jan. 26, 2004 and claims the benefit of priority of U.S. Application No. 60/442,315, filed Jan. 24, 2003, which is hereby incorporated by reference in its entirety.

STATEMENT REGARDING FEDERAL RIGHTS

This invention was made with government support under grant number DE-FG02-01ER45869, awarded by the Dept. of Energy. The government has certain rights in the invention.

FIELD OF THE INVENTION

This invention relates generally to deformable mirrors. In one aspect, the invention also relates to focus control using deformable mirrors. In addition, this invention also relates to methods of using the deformable mirrors. Further, this invention also relates to a method of fabricating the deformable mirrors.

BACKGROUND OF THE INVENTION

All publications and patent applications herein are incorporated by reference to the same extent as if each individual publication or patent application was specifically and individually indicated to be incorporated by reference.

The following description includes information that may be useful in understanding the present invention. It is not an admission that any of the information provided herein is prior art or relevant to the presently claimed inventions, or that any publication specifically or implicitly referenced is prior art.

Micro-electro-mechanical deformable mirrors ("MEMS-DMs") are useful for wavefront manipulation in imaging and beam forming systems. High degree-of-freedom mirrors are used to correct for random aberration from sources such as atmospheric turbulence. These mirrors are distinguished by the use of a large number of actuation sites, and can adopt complex surface shapes. Low degree-of-freedom mirrors can be designed for specific wavefront correction such as focus control. These mirrors cannot deform arbitrarily, but are intended to provide a variable amount of specified wavefront correction. In some applications a high degree-of-freedom mirror may be suitable to provide the same correction that a low degree-of-freedom mirror offers, but at the expense of a significantly more complex interface and control scheme. For applications such as endoscopic imaging systems, a simple interface and fast, precise wavefront correction for focus control and spherical aberration correction is desired.

Previously we described circular silicon nitride membrane mirrors for focus control (P. Himmer and D. Dickensheets, "Micromachined silicon nitride deformable mirrors for focus control", Optic Letters, Vol. 26, No. 16 (Aug. 15, 2001) and "High speed, large deflection deformable mirrors for focus and spherical aberration control", IEEE/LEOS Optical MEMS, Lugano, Switzerland (2002)). There mirrors employed two annular actuation zones to achieve spherical aberration free focus control, and also offered the possibility of correcting up to two waves of spherical aberration, measured at $\lambda=660$ nm. Use of these mirrors in an optical system necessitates the use of a beam splitter, if the incidence angle of the beam is to be normal to the mirror surface. Using the circular mirror with an incidence angle other than 90 degrees can eliminate the need for a beam splitter, but introduces off-axis aberrations.

SUMMARY OF THE INVENTION

The present invention is based, in part, on the discovery that membranes designed specifically for off-axis incidence of the optical beam can achieve diffraction-limited focus control in a miniature system.

In one aspect of the invention, a deformable optical element is provided. The deformable element includes a reflective surface and at least one actuator. The reflective surface receives a light beam defining an incident beam axis and includes a deformable member. The deformable member has a surface that includes at least one zone movable relative to its rest position. The at least one actuator is coupled to the at least one zone of the reflective surface. The reflective surface is oriented oblique to the incident beam axis so that upon actuation of the at least one actuator, the at least one zone deforms to approximate an off-axis paraboloid section and reflects the light towards a focusing plane spaced from the reflective surface and near the paraboloid focus such that a magnitude of wavefront aberrations of the light beam does not exceed about 20 percent of the wavelength of the light beam for a wavelength of 660 nm.

In another aspect of the invention, a method of providing an image with reduced optical aberrations using a deformable optical element having a reflective surface is provided. The method can be achieved by displacing the reflective surface along an axis generally orthogonal to the reflective surface so that the reflective surface deforms into an approximation of a sectioned surface of a paraboloid; and providing a light beam along an incident axis oblique to the sectioned surface such that optical aberrations in the image formed by the reflected light beam is reduced.

In yet another aspect of the invention, a method of fabricating a deformable optical element on a silicon substrate is provided. The method can be achieved by forming a dielectric composite member that assumes a parabolic surface of curvature formed by a sectioned portion of a parabolic reflector when the composite member is energized by at least one electrical conductive material.

Other advantages and features of the present invention become apparent to one skilled in the art upon reviewing the specification and the drawings provided herein. Thus, further objects and advantages of the present invention will be clear from the description that follows.

DETAILED DESCRIPTION

Unless defined otherwise, all technical and scientific terms used herein have the same meaning as commonly understood by one of ordinary skill in the art in related technical fields. Although any methods and materials similar or equivalent to those described herein can be used in the practice or testing of the present invention, the preferred methods and materials are described.

Figure 1:
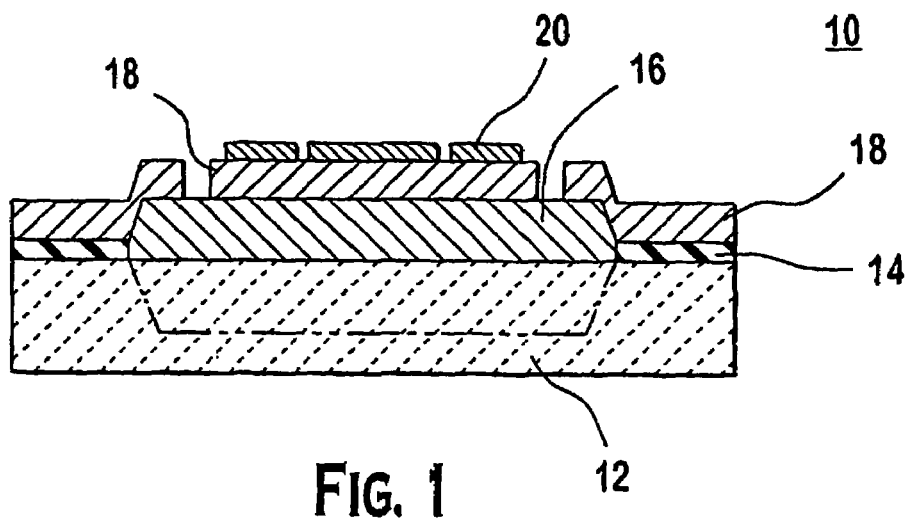
FIG. 1 illustrates a cross-sectional view of a composite dielectric optical element according to a preferred embodiment.

FIGS. 1-9 illustrate the preferred embodiments. In particular, a partially completed composite member 10 is shown in FIG. 1. The member 10 can include a substrate material 12 such as, for example, silicon. A thermal oxide layer 14 is disposed on the substrate 12. A nitride layer 18 can be formed on the thermal oxide layer 14. A sacrificial phosphosilicate glass layer 16 is also provided. A metallic layer 20 can also be formed on the nitride layer 18 to provide for a conductive and reflective surface. Preferably, the glass layer 16 is about 200 nanometer thick, the nitride layer is about 1 micron thick LPCVD low-stress silicon nitride with residual stress of between 50-100 MPa, the metallic layer 20 is a sputtered deposited layer of chromium of about 50 Angstrom thick and gold of about 1000 Angstrom thick. In a preferred embodiment, the topmost metal layer is patterned into two conductive members that define respective electrodes for an electrostatic actuator.

Figure 2:
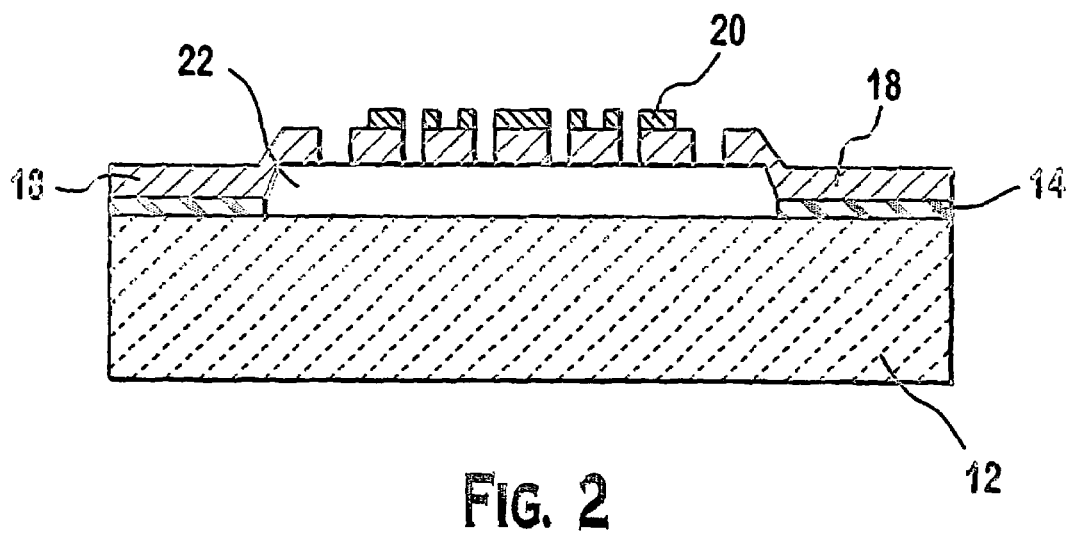
FIG. 2 illustrates the partial etching of the optical element to provide for an air gap.
Figure 3:
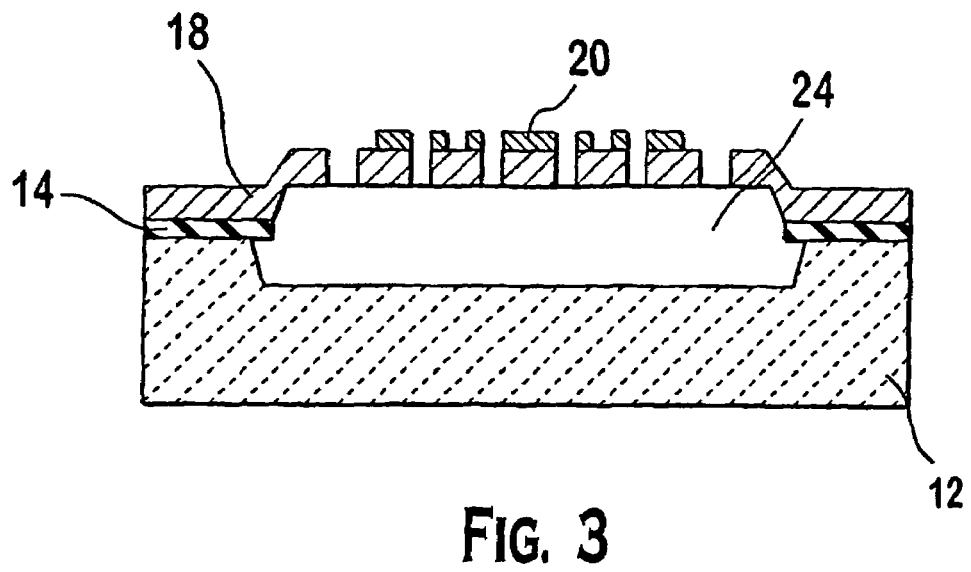
FIG. 3 illustrates the final etching of the optical element of FIG. 2 to provide for a predetermined airgap according to a preferred embodiment.

As shown in FIG. 2, a sacrificial oxide etching process is preferably provided to remove the glass layer 16. Preferably, the etching process utilizes an acid etching process such as, for example, HF acid. As shown in FIG. 3, an anisotropic etching process is preferably provided to remove some of the substrate layer 12, which can be wet or dry type. The optical element 10 is shown in FIG. 3 with air gaps between the nitride layer 8 and the substrate material 12.

Figure 4:
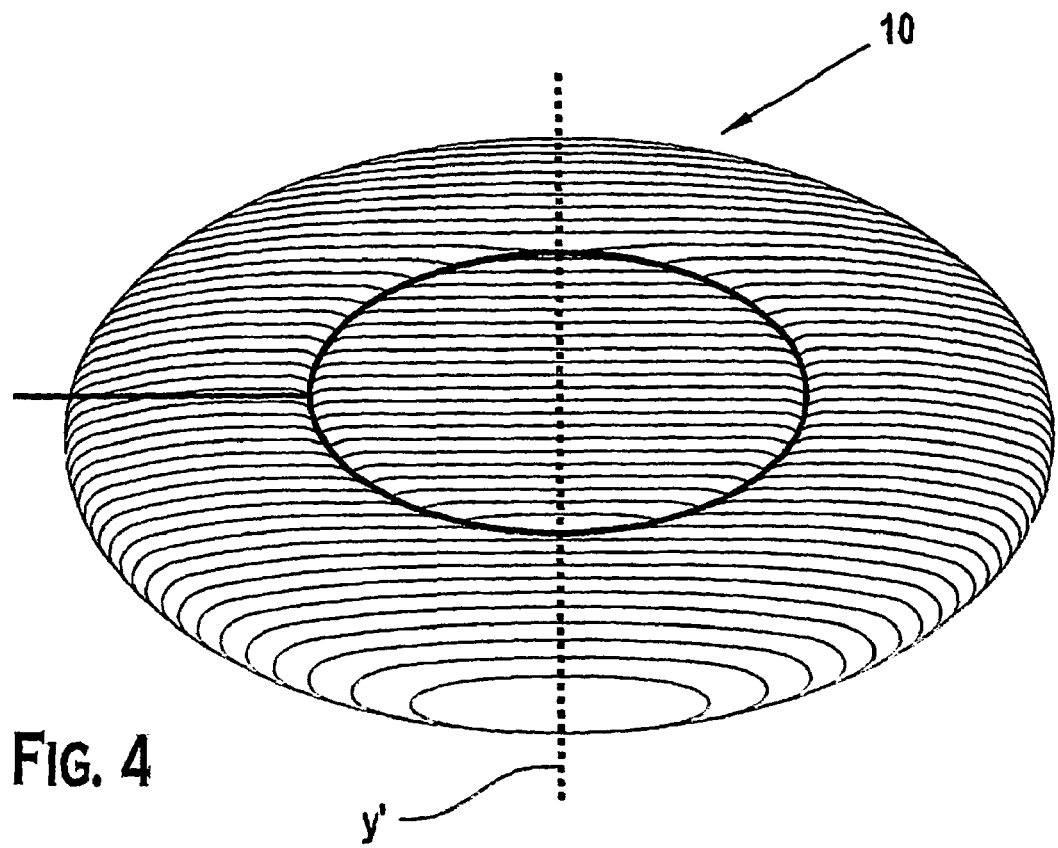
FIG. 4 illustrates the curvature of the surface of a preferred embodiment by interference photography.
Figure 5:
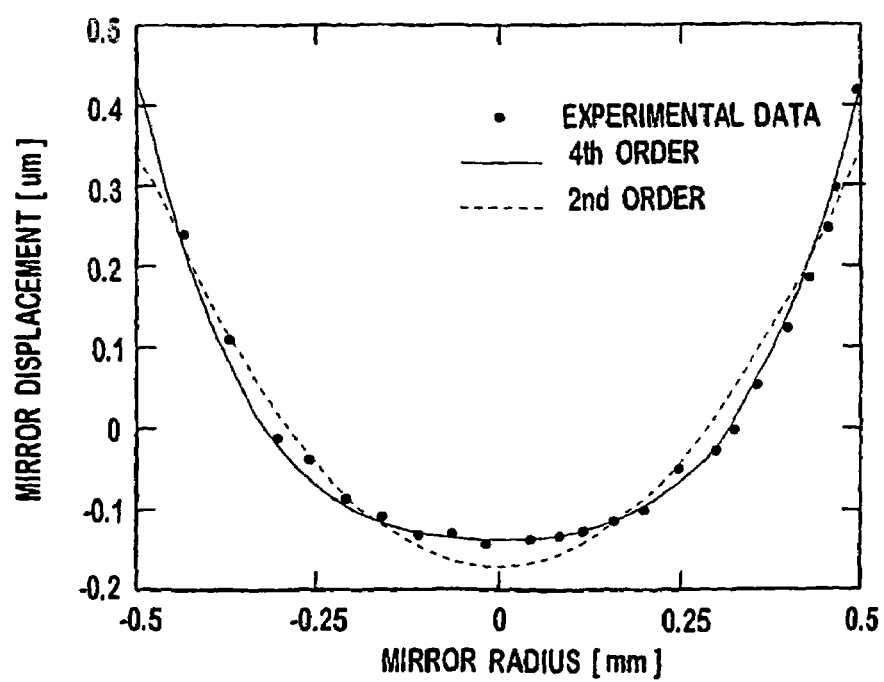
FIG. 5 illustrates the curvature of the optical element according to a preferred embodiment as being generally in agreement with theoretical surface of curvature.

The optical element 10 is deformable upon application of electromotive force to the metallic layer 20. Specifically, as shown by an interference pattern depicted in FIG. 4, a preferred embodiment of the optical element can be deformed to provide a surface of curvature that approximates a paraboloid section. The surface of curvature in the preferred embodiment of FIG. 4 is plotted as a plurality of indicia on a graph to show the profile of the surface of curvature in FIG. 5. In FIG. 5, the surface profile of the optical element 10 is denoted by dotted indicia that fit to the solid line denoting a fourth order polyminal and fit to the broken line denoting a second order polynomial, thereby showing that the surface of curvature is suitable as an optical reflector element. That is, when the optical element 10 is deformed to approximate a parabolic optical surface such as, for example, in FIG. 5, the optical element 10 provides many advantages as compared to other optical elements. One advantage, as compared to a spherical reflector is the virtual reduction of astigmatism when used as an off-axis reflector, i.e., a reflector surface that provides a surface oblique to the incident beam axis. That is, for infinite conjugate imaging, an off-axis parabolic mirror can provide a generally aberration free image for a beam incident parallel to the axis of symmetry of the parabolic mirror. Reference is now made to FIGS. 6A to 6D to provide an exemplary illustration of how a parabolic surface can be generated so that the optical element 10 can be controlled to approximate such parabolic surface.

Figure 6A:
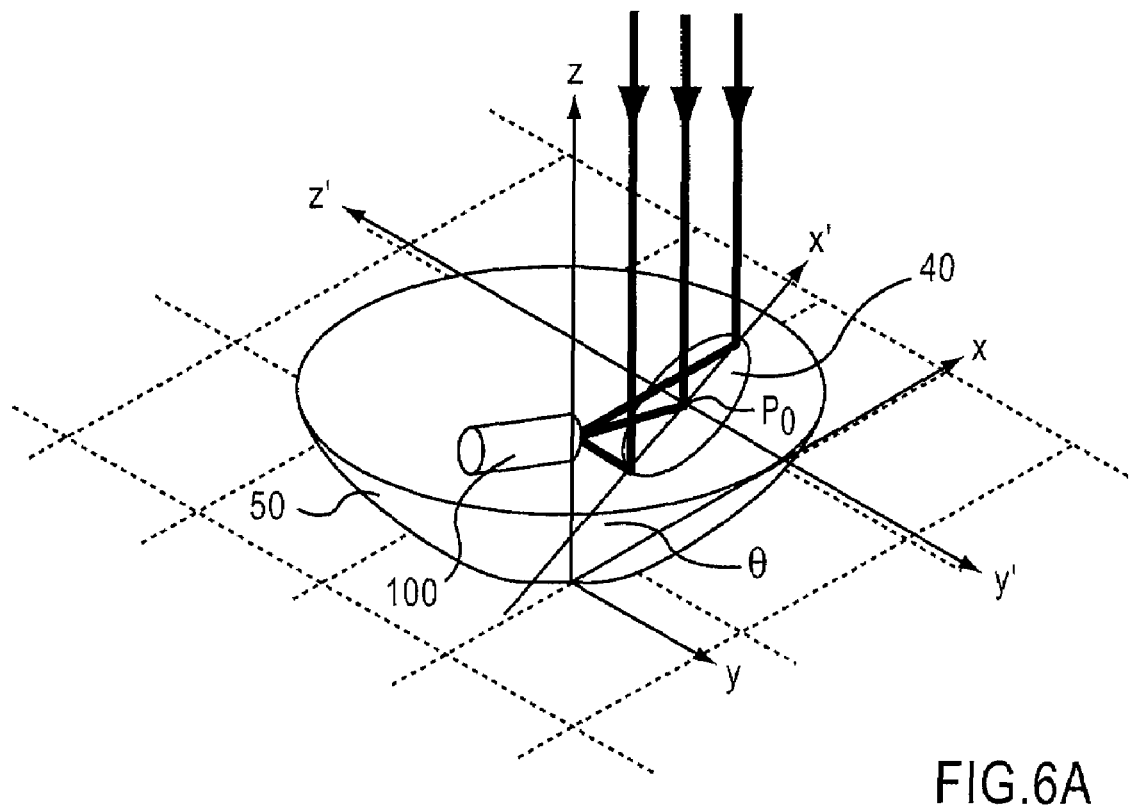
FIG. 6A is a graphical representations showing paraboloid with off-axis segment highlighted and showing coordinate system used in the evaluation of the optical surface.
Figure 6B:
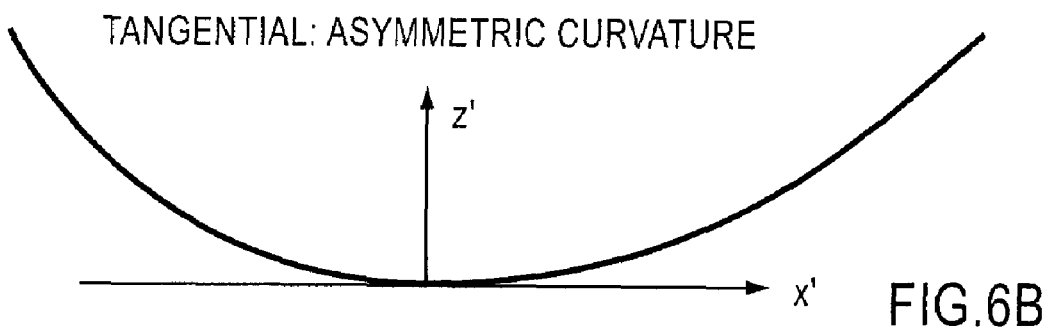
FIGS. 6B and 6C are cross sections of a paraboloid rotated to 45 degrees. Rotated axes are labeled as x', y' and z'.

Referring to FIG. 6A, a reflective parabolic surface 40 can be generated by utilization of a sectioned portion of a parabolic optical element 50. The parabolic element 50 can be a parabolic reflector known generally as a circular paraboloid. One technique of generating the parabolic surface can be extending a virtual plane through the circular paraboloid at a desired angle of incident θ so that the surface formed by the virtual plane has an oval outer perimeter connected to a parabolic sectioned surface.

Figure 6C:
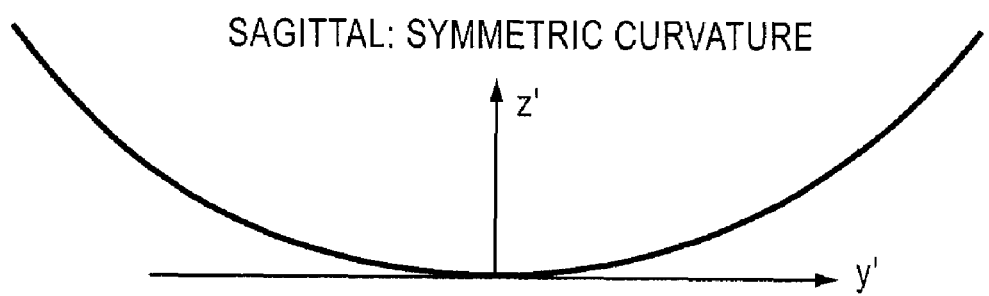
Figure 6D:
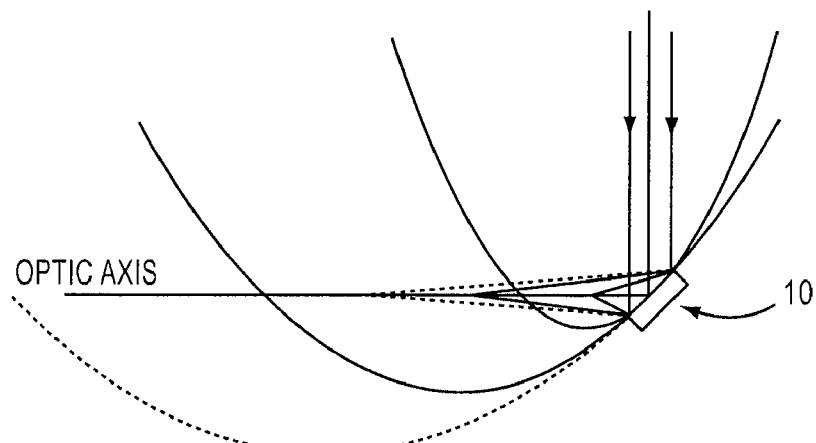
FIG. 6D illustrates different off-axis paraboloids with different focal lengths, shown with the corresponding focused beams.

In FIG. 6A, the parabolic element 50 can be represented by a paraboloid on a Cartesian coordinate. In particular, where the parabolic element 50 is symmetrical about axis z, the parabolic element 50 can be defined by the general equation $z=a(x^2+y^2)$ with orthogonal axes x and y. Upon the extension of a virtual plane through the paraboloid, a sectioned surface of curvature is formed. The sectioned surface can be defined by rotation of the coordinate axes x, y, and z about an axis generally parallel to the y axis to define a shifted coordinate x', y' and z' over angle θ. When viewed against a plane defined by the new axes z' and x' (FIG. 6B) the sectioned surface can be seen to be asymmetric about the z' axis (i.e., a tangential section). And as viewed against a plane defined by axes z' and y' in FIG. 6B, the sectioned paraboloid surface can be seen to be generally symmetrical about the z' (i.e., a sagittal section). Depending on the coefficient "a" describing the curvature of a given paraboloid, different focal lengths can also be obtained, as shown in FIG. 6D.

Figure 7:
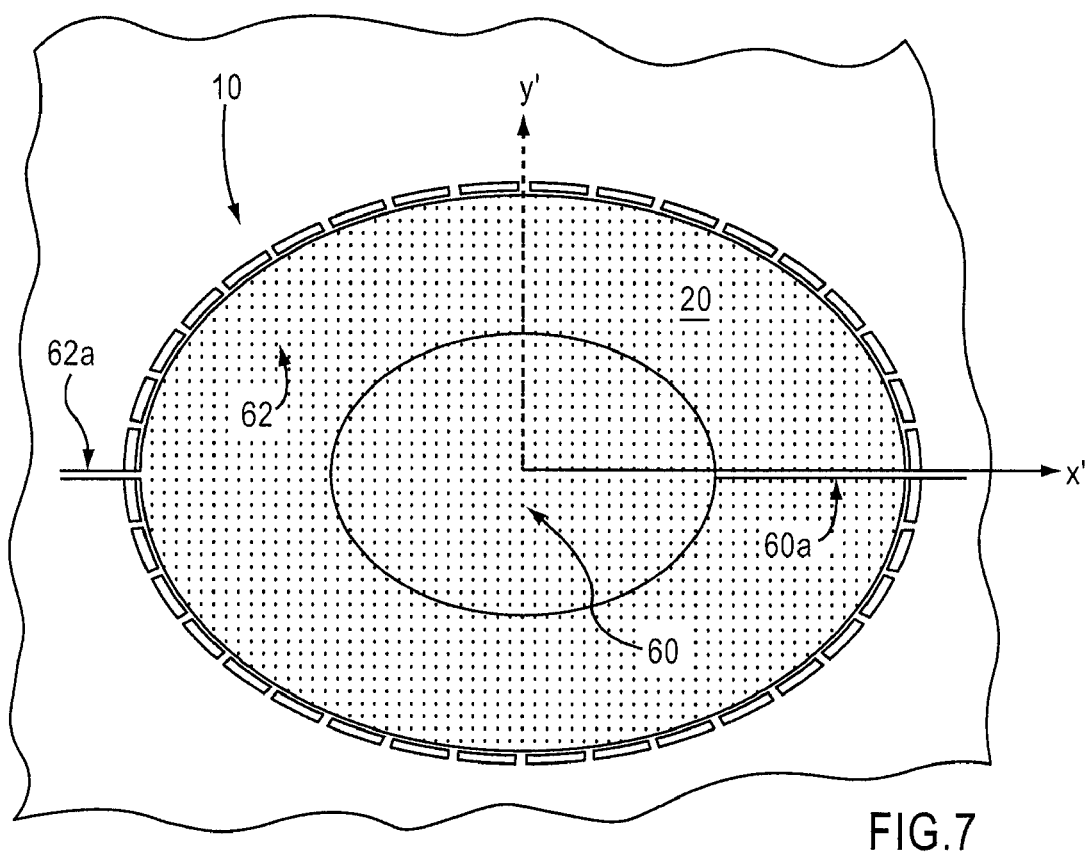
FIG. 7 is a pictorial representation of the optical element of the preferred embodiments with the actuators formed thereon.

As shown in FIG. 7, the optical element 10 is preferably provided with two actuators 60 and 62. The first actuator 60 can be formed to surround proximate a central portion of the optical element 10 with electrical connector 60a for electrical communication with an electromotive source. The second actuator 62 surrounds the first actuator 60 and located proximate the outer perimeter of the optical element 10. It should be noted that other configurations and arrangements of the actuators can be provided such as, for example, different spacings between the first and second zones or actuators or more than two actuators. Furthermore, the actuators can be formed as segmented portions or continuous portions depending on the desired deformation of the optical element 10. Corresponding connector 62a is provided for electrical communication with an electromotive source. The two actuators 60 and 62 can be provided with differential voltages (e.g., different voltage levels) so that the surface 20 is deformed into a sectioned paraboloid surface along axis z'. The surface 20 or portions of the surface 20 can be moved at any suitable displacement and configuration to provide a desired surface of curvature. In the preferred embodiments, the displacement of the surface 20 can be 0 to 2.5 microns, and as high as 5 microns. Alternatively, the two actuators can be provided with the same voltage such that both actuators can operate as a single actuator.

While silicon nitride is the preferred material to use to male the deformable mirrors of the present invention, any suitable materials may be used to make the mirrors. For example, polymeric materials may be useful in making the mirrors of the present invention. Such polymeric materials may be identified by one skilled in the art using standard laboratory techniques based on the disclosures herein.

Examples of preferred materials to use in manufacturing the deformable mirrors of the present invention include but are not limited to silicon nitride, polysilica and Mylar®.

The general details for fabricating deformable mirrors are well known to those skilled in the relevant art. See, for example, U.S. Pat. Nos. 6,661,561; 6,656,768; 6,507,082; 6,398,372; 6,293,680; 6,236,490; 6,181,459; 6,108,121; 6,002,661; 5,986,795; 5,777,807; 5,661,592 and 5,311,360, all of which are herein incorporated by reference in their entirety.

EXAMPLES

It is believed that by using an optical element 10 with an elliptical boundary (as shown and described in the preferred embodiments), the optical element 10 reduces the astigmatism introduced by a circular membrane mirror. In the preferred embodiment of the optical element 10, the optical element can be mirrors having dimensions of 1.414 mm by 1 mm, for the length major and minor axes respectively, resulting in an ellipticity of 1.414. Two actuation zones can be used in these examples to provide control over spherical aberration. Perimeter segmentation allows for a lower actuation voltage and improved surface figure of the resulting devices. It has been demonstrated that deflections of up to 2.7 microns for the optical element 10 can be provided, while maintaining optical aberration of the reflected wavefront to less than ($\lambda \div 8$), measured at $\lambda = 660$ nm.

The required optical mirror shape for off-axis focusing depends upon the imaging system configurations. For infinite conjugate imaging, an off-axis parabolic mirror will yield an aberration free system configuration. For infinite conjugate imaging, an off-axis parabolic mirror will yield an aberration free image for a beam incident parallel to the axis of symmetry of the paraboloid.

FIG. 6A illustrates a beam with a preferable incidence angle of 45° with respect to the local surface normal such that the beam comes to a focus at the paraboloid focus, incurring both a right angle redirection as well as focusing.

As an example, for a 45° angle of incidence, the chief ray reflects off of the paraboloid at point $P_0$, given by the following formula:

$$(x_0, z_0) = (1/(2a), 1/(4a))$$

where a is the quadratic coefficient of the paraboloid specified in Equation 1.

$$z = a(x^2 + y^2) \tag{1}$$

To calculate the necessary shape of the reflective membrane centered at $P_0$, the coordinate system is shifted to $P_0$ and rotated by 45° about an axis parallel to y and intersecting $P_0$. The new primed coordinates are illustrated in FIG. 6A. This results in Equation 2, for the paraboloidal section in the new coordinate system.

$$(a/2)z'^2 + ay'^2 + (a/2)x'^2 - ax'z' - \sqrt{2}z' = 0 \tag{2}$$

The tangential section is taken in the y'=0 plane, give by Equation 3 for tangential curvature.

$$az'^2 - 2z'(\sqrt{2} + ax') + ax'^2 = 0 \tag{3}$$

The sagittal section is taken in the x'=0 plane and is given by Equation 4 for sagittal curvature.

$$\tfrac{1}{2}(az'^2) + ay'^2 - \sqrt{2}z' = 0 \tag{4}$$

The tangential curvature is not symmetric in X', and can only be approximated with a symmetric surface. The sagittal curve described by Equation 4 is an ellipse, and is symmetric in y', as illustrated in FIG. 6C. The tangential curvature is shown in detail in FIG. 6B.

Because of the small membrane displacements, the $Z'^2$ term in Equations 3 and 4 can be dropped without introducing significant error. Typical z' displacements are no more than 4 microns, making the $z'^2$ terms several orders of magnitude smaller than the remaining terms. To facilitate comparison to the surface curvature measured from the elliptical membranes, Equation 3 can be approximated using a Taylor's series expansion, dropping terms of order greater than 4. The resulting expressions for surface deformation along the tangential and sagittal sections are given in Equation 5, for tangential section, and Equation 6, for sagittal section.

$$z'(x') \cong ((\sqrt{2}a)/4)x'^2 - (a^2/4)x'^3 + ((\sqrt{2}a^3)/8)x'^4 \tag{5}$$

$$z'(y') \cong ((\sqrt{2}a)/2)y'^2 \tag{6}$$

The effective focal length of the 45° off-axis paraboloidal mirror is 1/(2a), twice the focal length of the paraboloid which is ¼a. Furthermore, the effective curvature of the mirror surface along the sagittal section is twice the curvature along the tangential section. FIG. 6D illustrates paraboloids corresponding to three different focal lengths for the reflective membrane.

The surface curvature of a membrane can be obtained within the framework of the theory of elasticity using Poisson's equation (Timoshenko and Goodier, "Theory of Elasticity", Engineering Societies Monographs, $3^{rd}$ edition, McGraw Hill (1970)). Equation 7 gives the solution for an elliptical boundary with a uniform load and in-plane tension.

$$z' = (pa^2b^2((x^2/a^2) + (y^2/b^2))) \div 2T(a^2 + b^2) \tag{7}$$

The mechanical constants in Equation 7 are defined as follows: p is the applied uniform pressure and T is the membrane tension. The major axis half width a and the minor axis half width b are related by a=eb where e is the eccentricity of the ellipse. The coordinate system (x',y',z') is shown in FIG. 6A. The major axis is x', the minor axis is y', and z' is the membrane deflection. In both sagittal (minor axis) and tangential (major axis) directions membrane curvature is parabolic. The membrane's tangential and sagittal parabolic coefficients $a_{2t}$ and $a_{2s}$ can be related by the ratio given by Equation 8.

$$(a_{2t} \div a_{2s}) = (b^2 \div a^2) \tag{8}$$

The ratio of the parabolic curvatures is the square of the inverse of the eccentricity. For an eccentricity of $\sqrt{2}$ membrane theory predicts the sagittal parabolic curvature shrill be twice that of the tangential curvature. This is the required curvature relationship for the off-axis mirror with 45° beam incidence angle.

Because the membrane should deform as a paraboloid in x' and y', it will introduce aberration onto the reflected beam. The aberration may be calculated by comparing the membrane deflection predicted by Equation 7 to the desired surface shape specified by Equation 2. Considering only the sagittal section (x'=0), it is apparent that the aberration should be zero when evaluated along this section. That is because both Equation 7 and Equation 6 show only $y'^2$ dependence. The tangential section will exhibit finite aberration.

Figure 8:
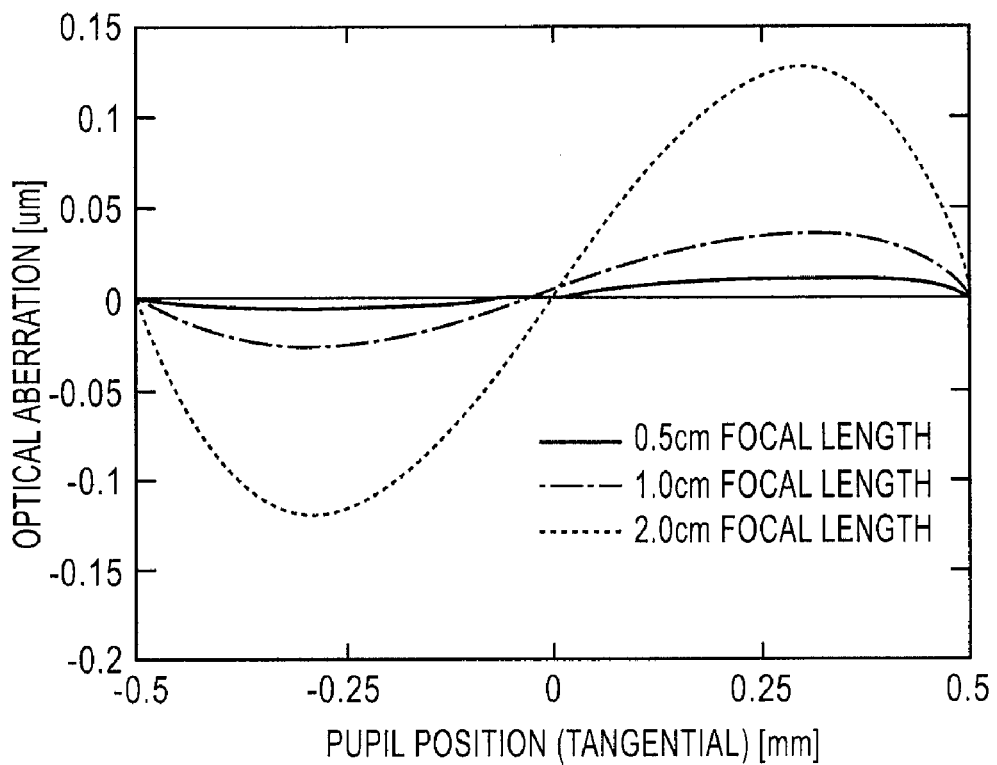
FIG. 8 is illustration of a wavefront aberration in the reflected beam, along the tangential section. The x-axis represents the radial position in the optical beam. Focal lengths indicated in the figure are the effective focal length of the membrane mirror.

For a surface with small displacement z', an optical wavefront incident at 45° will experience an optical path retardation given by $n\sqrt{2}z'$, where n is the index of refraction of the medium. We define the optical wavefront aberration of our membrane mirrors as $w=\sqrt{2}(z'_{ref}-z'_{memb})$, where $z'_{ref}$ is the reference surface of the off-axis paraboloid given in Equation 2 (or Equations 5 and 6 for tangential and sagittal sections, respectively), and $z'_{memb}$ is the surface deflection of the membrane. FIG. 8 shows the tangential section optical wavefront aberration anticipated for our membrane mirrors, based on the uniform load membrane approximation given in Equation 7. For focal lengths longer than 10 mm, this theory predicts aberrations less than 0.06 microns peal-to-peak, which is on the order of ($\lambda \div 10$) for visible wavelengths.

The elliptical mirrors were preferably fabricated using a silicon nitride surface micromachining process. This process uses a sacrificial phosphosilicate glass (PSG) layer, and incorporates a bulk silicon etch following the sacrificial release etch. The purpose of the bulk etch is to create an arbitrary deep air cavity, thereby allowing large actuation distances. Because the bulk silicon etch creates the cavity, the PSG sacrificial layer can be made as thin as diffusion of the PSG etchant will allow.

The mirrors are preferably fabricated on silicon (100) wafers, which is preferred for the final anisotropic bulk etch. An 8% PSG layer 200 nm thick is deposited as the sacrificial layer. The mirror structural layer is 1 micron thick LPCVD low-stress nitride. Residual stress measurements place the residual stress between 50-100 Mpa. A chrome-gold metalization layer is sputtered on top of the silicon nitride to serve as the reflective mirror surface as well as the actuation electrodes. The chrome layer is ~50 Å thick and is used for adhesion promotion. The gold layer is 1000 Å thick which has proven sufficient for actuation and reflectivity. The top metal layer is patterned into two separate electrodes: an inner electrode (500×707 microns) and an outer annular electrode. See FIG. 1 for a pictorial cross-section illustrating the fabrication sequence (left) and a top view of the elliptical mirror (FIG. 7). FIGS. 2 and 3 provide pictorial representations of the release process.

Measurement of surface curvature is obtained using a Mirau interferometric Nikon M-Plan 10×DI microscope objective. Tilt of the sample generates an interference pattern across the surface of the mirror. As shown in the drawing representing the top view of the optical element 10 in FIG. 4, interference fringe locations, along a cross section, give the surface curvature of that cross section. After subtracting off the linear tilt of the mirror, the fringe spatial locations vs. relative surface height are fit with an even fourth order polynomial. The sagittal (indicated by the white line in FIG. 4) and the tangential directions are independently measured using this method.

Data sets are obtained for a series of inner and outer electrode voltage pairs. Resulting data sets are interpolated to obtain second and fourth order coefficients for any arbitrary [inner, outer] voltage pair. The polynomial fit surface figures can be compared against the desired optical shape and to the shape predicted from membrane theory. As an example of the measurements described herein, FIG. 5 provides the experimental data for a 1×1.414 mm elliptical mirror.

Figure 9A:
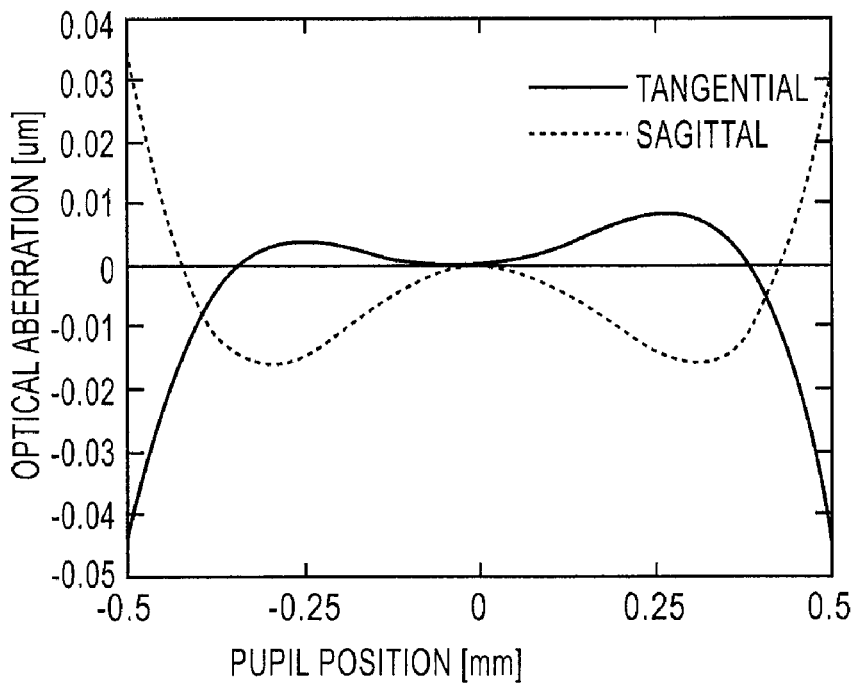
FIGS. 9A-9C are experimental data of a preferred embodiment. Specifically, the experimental data illustrate optical wavefront aberrations for the deformable mirror with respective focal lengths of 70 mm, 50 mm and 36 mm.
Figure 9B:
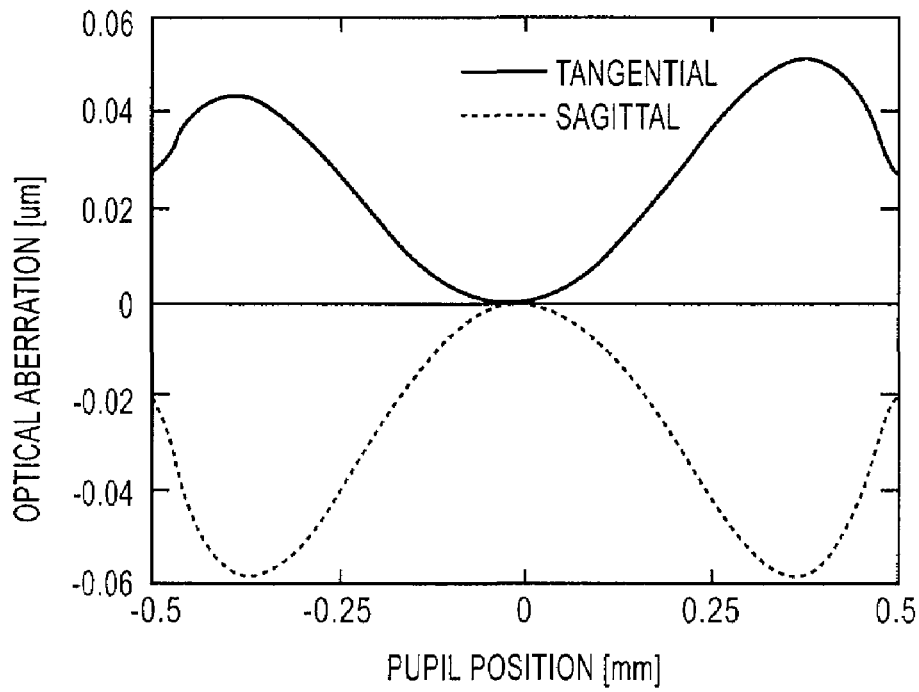
Figure 9C:
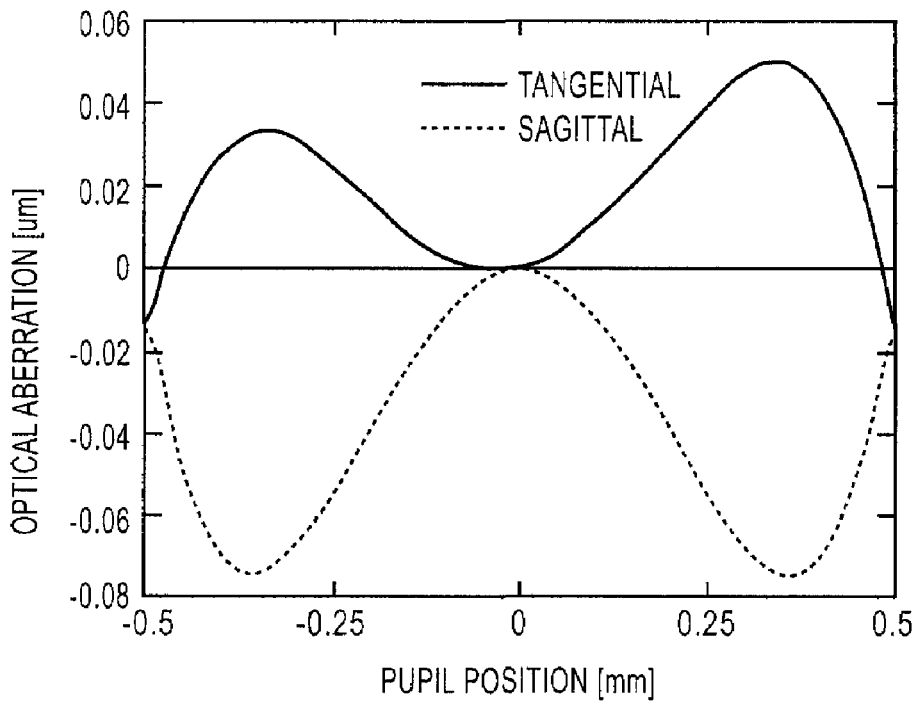

Measured aberration of the optical wavefront is shown for three mirror deflections in FIGS. 9A, 9B and 9C. The wavefront aberration is the optical path difference between the theoretical off-axis paraboloid reflector and the $4^{th}$ order polynomial fit of the experimental surface figure data. Both tangential and sagittal sections are shown, with tangential data plotted with respect to a reduced distance, corresponding to the projection of the tilted elliptical reflector onto a surface that is normal to the beam propagation direction. Table 1 provides the polynomial coefficients tabulated for the sagittal and tangential sections as shown in FIGS. 9A, 9B, and 9C. The theoretical sagittal parabolic curvature coefficients $a_2$, corresponding to twice the measured tangential $a_2$ coefficient, is shown in Table 1 as well. These coefficients apply to mirror (x',y') coordinates.

TABLE 1

Quadratic and quartic curvature coefficients for the deformed mirror data in FIG. 7.

| effective focal length | applied voltage in volts (inner, outer) | center deflection | | measured coefficients | | theoretical curvature |
|---|---|---|---|---|---|---|
| | | | | tangential | sagittal | sagittal |
| ∞ | (0, 0) | 0 | $a_2$ | $-1.2 \times 10^{-8}$ | $-4.7 \times 10^{-8}$ | 0 |
| | | | $a_4$ | $4.5 \times 10^{-13}$ | $3.1 \times 10^{-13}$ | 0 |
| 70 nm | (108, 110) | 1.25 µm | $a_2$ | $2.5 \times 10^{-6}$ | $5.3 \times 10^{-6}$ | $5.05 \times 10^{-6}$ |
| | | | $a_4$ | $2.6 \times 10^{-13}$ | $-1.4 \times 10^{-12}$ | 0 |
| 50 nm | (118, 126) | 1.75 µm | $a_2$ | $3.5 \times 10^{-6}$ | $7.7 \times 10^{-6}$ | $7.07 \times 10^{-6}$ |
| | | | $a_4$ | $2.0 \times 10^{-14}$ | $-2.7 \times 10^{-12}$ | 0 |
| 36 nm | (125, 141) | 2.5 µm | $a_2$ | $4.7 \times 10^{-6}$ | $1.1 \times 10^{-5}$ | $9.8 \times 10^{-6}$ |
| | | | $a_4$ | $5.5 \times 10^{-13}$ | $-3.2 \times 10^{-12}$ | 0 |

For a mid-range focus adjustment, the relative inner and outer electrode voltages may be changed to effect more than one wave of spherical aberration adjustment, positive or negative. For the range of focal lengths given in Table 1, it is possible to null the fourth-order term altogether for either the tangential or sagittal section. However, for the electrode design that we used it is not possible to simultaneously null the fourth-order term for both sagittal and tangential sections. The voltage pairs that are listed in Table 1 were chosen to balance the spherical aberration and parabolic curvature terms for the two sections, in order to minimize overall peak-to-peak aberrations of the mirror. For focal lengths ranging from ∞ to 36 mm, wavefront aberration could be maintained to less than 0.13 microns, corresponding to approximately ($\lambda \div 5$) for 660 nm illumination.

The fourth-order aberration observed in the measured surface figure data illustrates the departure of the fabricated mirrors from a simple uniformly-loaded membrane model. As the membrane is deflected, the change in the air gap beneath the membrane results in a non-uniform pressure across the surface. The center experiences a greater force than the perimeter, which is compensated by increasing the voltage on the outer electrode. For large deflections this is a significant effect.

With appropriate choice of inner and outer electrode voltages, the spherical aberration along the tangential section can be made arbitrarily small, so that parabolic curvature obtains and the residual aberration becomes the theoretical minimum illustrated in FIG. 8. In this case, however, the spherical aberration along the sagittal section becomes the dominant aberration. The overall aberration of the off-axis reflector can be significantly reduced if a redesign of the electrodes is made so that simultaneous correction of the fourth-order curvature for both sagittal and tangential sections was possible. In that case, focal lengths as short as 10 mm with a 1 mm diameter pupil should be possible to achieve, while maintaining less than 0.06 microns optical wavefront aberrations, which is ($\lambda \div 10$) at 660 nm. Nevertheless, the non-optimized mirrors of this example still exhibit less than ($\lambda \div 5$) aberration for focal lengths ranging from $\infty$ to 36 mm.

Thus, this example demonstrates focus control mirrors designed for a 45° beam incidence angle. It should be noted, however, that other appropriate angles of incident can be used. Two actuation zones provide control over surface figure, and allow maintaining peak-to-peak wavefront aberration to less than 0.13 microns over a focus adjustment range from $\infty$ to 36 mm. Theoretical analysis predicts that elliptical membranes used for a 1 mm diameter beam should be able to maintain less than 0.6 microns peak-to-peak wavefront aberration for focal lengths as short as 10 mm. An optimized two-zone actuator will allow a practical device to achieve similar performance.

Deformable mirrors ("DMs") have potential applications in any technology involving laser and optical systems, including but not limited to industry, medicine, defense and consumer products. Examples of some specific technologies where DMs are particularly useful are provided below.

Optical Communications. Free-space optical communication concepts provide wireless links that are covert (cannot be intercepted), un-jammable, and low power when compared to radio-frequency alternatives. DMs can be used to reduce the beam divergence, which reduces the size and power of the laser transmitters and compensate for atmospheric distortion. Operational uses include satellite communication space-to-space, space-to-aircraft, and space-to-ground—and last mile data transmission to link fiber optical trunks to end-user equipment.

Laser Rangefinders, Designators, and Trackers. Hardware ranging from hand-held to aircraft-mounted systems could benefit from DM laser beam improvement to increase effective range and/or reduce physical size and electrical power requirements of the laser. Another use can be for optical readers in optical disk drives such as CD-ROM, CD-Read/Write, DVD-ROM or DVD-Read/Write.

Surveillance Imaging Systems. Whether used for direct viewing or video camera monitoring and recording, surveillance systems could benefit from the real-time atmospheric distortion and vibration compensation afforded by an active deformable mirror.

Large-Aperture Cameras. The cost of the large, high-quality lenses required for long-range, high-resolution, low-light cameras (film, digital and video) is prohibitive for many applications and users. If the optical system includes a deformable mirror to correct lens aberrations, the lens elements can be of much poorer quality and, hence, lower cost.

Biomedical Imaging. Several types of imaging, instruments are used in the biomedical field. Examples of the use of DMs in medical instrumentation include but are not limited to catheters and spectroscopic instruments. Many of these types of medical instruments could benefit from improved focus, clarity, and resolution. The ophthalmoscope, for example, is used to image the eye's retina for diagnosing various diseases and conditions. The quality of the retinal image is reduced by the optical aberrations and imperfections of the eye's lens. Experiments with DMs have shown diagnostically significant improvement in ophthalmoscope performance.

Space Observation and Photography. One of the first applications to turn to deformable mirrors was the field of astronomy. The atmosphere not only causes the stars to twinkle but distorts images of the planets and space vehicles. Several modern telescopes built with deformable mirrors provide previously unattainable performance.

Holography. DMs are also used in holographic projections. See, for example, J. M. Florence and R. O. Gale, "Coherent optical correlator using a deformable mirror device spatial light modulator in the Fourier plane," Applied Optics, 27(11): 2091-2093 (1988).

3-D Display Systems. DMs are used to generate multiple focal planes within a scanned light display, or virtual retinal display (VRD). See, for example, McQuaide et al., SID 02 Digest, 50.4:1-4; Suyama et al., Japanese Journal of Applied Physics, 39:480:2000; Ashizaki et al., U.S. Pat. Nos. 5,355, 181; 5,467,104; and Mills et al., SPIE 507:93 (1984).

The publications discussed herein are provided solely for their disclosure prior to the filing date of the present application. Nothing herein is to be construed as an admission that the present invention is not entitled to antedate such publication by virtue of prior invention.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed is:

1. A deformable optical element, comprising:
a reflective surface that is operable to receive a light beam defining an incident beam axis, the incident beam axis lying along a predominant direction of propagation of the light beam, the reflective surface including a deformable member having a surface including at least one zone movable with respect to a rest position in which the reflective surface is substantially planar, the reflective surface having a defined surface normal axis that is perpendicular to the reflective surface when the reflective surface is in the rest position, the incident beam axis being at an angle with respect to the surface normal axis; and
at least one actuator coupled to the at least one zone of the reflective surface to, upon actuation of the at least one actuator, cause the at least one zone of the reflective surface to be deformed to approximate a section of a paraboloid of revolution, the section having an approximately elliptical boundary on the surface of the deformable member corresponding to the section being off center with respect to an axis of revolution of the paraboloid of revolution, the axis of revolution being substantially parallel to the incident beam axis, the major and minor axes of the elliptical boundary having different lengths, the section reflecting and focusing the light beam toward a focusing plane in a neighborhood of a geometrical focus of the paraboloid of revolution.

2. The deformable optical element of claim 1, wherein the paraboloid of revolution has the shape defined by $z=a(x^2+y^2)$, where z defines the axis of revolution, x, and y define orthogonal axes with respect to each other and the z axis, and a is the quadratic coefficient for the paraboloid of revolution.

3. The deformable optical element of claim 2, wherein the section is centered at a point $P_0=(x_0,0,z_0)$ on the paraboloid of revolution, the point $P_0$ not lying on the axis of revolution, the paraboloid section being defined in terms of local mutually orthogonal coordinate axes x', y', and z' having an origin at the point $P_0$, the y' axis being parallel to the y axis, the x' and z' axes being rotated by an angle θ with respect to the x and z axes, respectively, the x' axis being tangent to the surface of the paraboloid of revolution at the point $P_0$, the z' axis being normal, at the point $P_0$, to both the surface of the paraboloid of revolution and the surface of the deformable member.

4. The deformable optical element of claim 3, wherein the angle θ comprises an angle of approximately 45 degrees and the point $P_0$ is given approximately by the coordinates $(x_0,y_0,z_0)=(1/(2a),0,1/(4a))$ such that the paraboloid section is defined by $(a/2)z'^2+ay'^2+(a/2)x'^2-ax'z'-(\sqrt{2})z'=0$ in the local coordinate system of the section, the major semi-axis of the section having a length along the x' axis that is approximately $(2)^{1/2}$ times that of the minor semi-axis of the section along the y' axis.

5. The deformable optical element of claim 3, wherein the optical element comprises a plurality of layers, and one of the layers includes a metal layer on at least one of the plurality of layers.

6. The deformable optical element of claim 5, wherein the metal layer comprises at least one reflective layer comprising at least one of: gold, palladium, platinum, chromium, aluminum, tantalum, titanium, and combinations thereof.

7. The deformable optical element of claim 6, wherein the metal layer is operable to conduct electrons from an electromotive source.

8. The deformable optical element of claim 7, wherein the metal layer comprises a first surface exposed to the light beam and a second surface coupled to a nitride layer, the nitride layer couples to a thermal oxide of silicon, and wherein the plurality of layers further couple to a silicon substrate, and wherein an air gap is formed between the nitride layer and the silicon substrate by etching away at least one of the oxide of silicon and a portion of the silicon substrate.

9. The deformable optical element of claim 8, wherein the metal layer comprises a chromium layer bonded to a gold layer with the chromium layer having a thickness less than the gold layer.

10. The deformable optical element of claim 7, wherein the plurality of layers comprises the metal layer with a first surface exposed to the light beam and a second surface coupled to a layer that couples to a substrate, the layer including at least one of polysilica, polyimide, and polyester or combinations thereof.

11. The deformable optical element of claim 1, wherein the at least one actuator comprises a first actuator surrounding a second actuator on the deformable member to form concentric elliptical actuators on the surface of the deformable member and wherein at least one of the first and second actuators is operable to move the deformable member over a distance.

12. The deformable optical element of claim 11, wherein the deformable member is operable to move over a distance of up to 2.5 microns (2.5 µm).

13. The deformable optical element of claim 1, wherein the at least one zone is operable to deform such that a magnitude of wavefront aberrations of the light beam is reduced to a percentage of the wavelength of the light beam.

14. The deformable optical element of claim 13, wherein the magnitude of wavefront aberrations of the light beam is reduced to about 20 percent of the wavelength of the light beam.

* * * * *